Dec. 26, 1950   T. SLICK   2,535,099
BRUSH PULLER
Filed Aug. 9, 1947   3 Sheets-Sheet 1
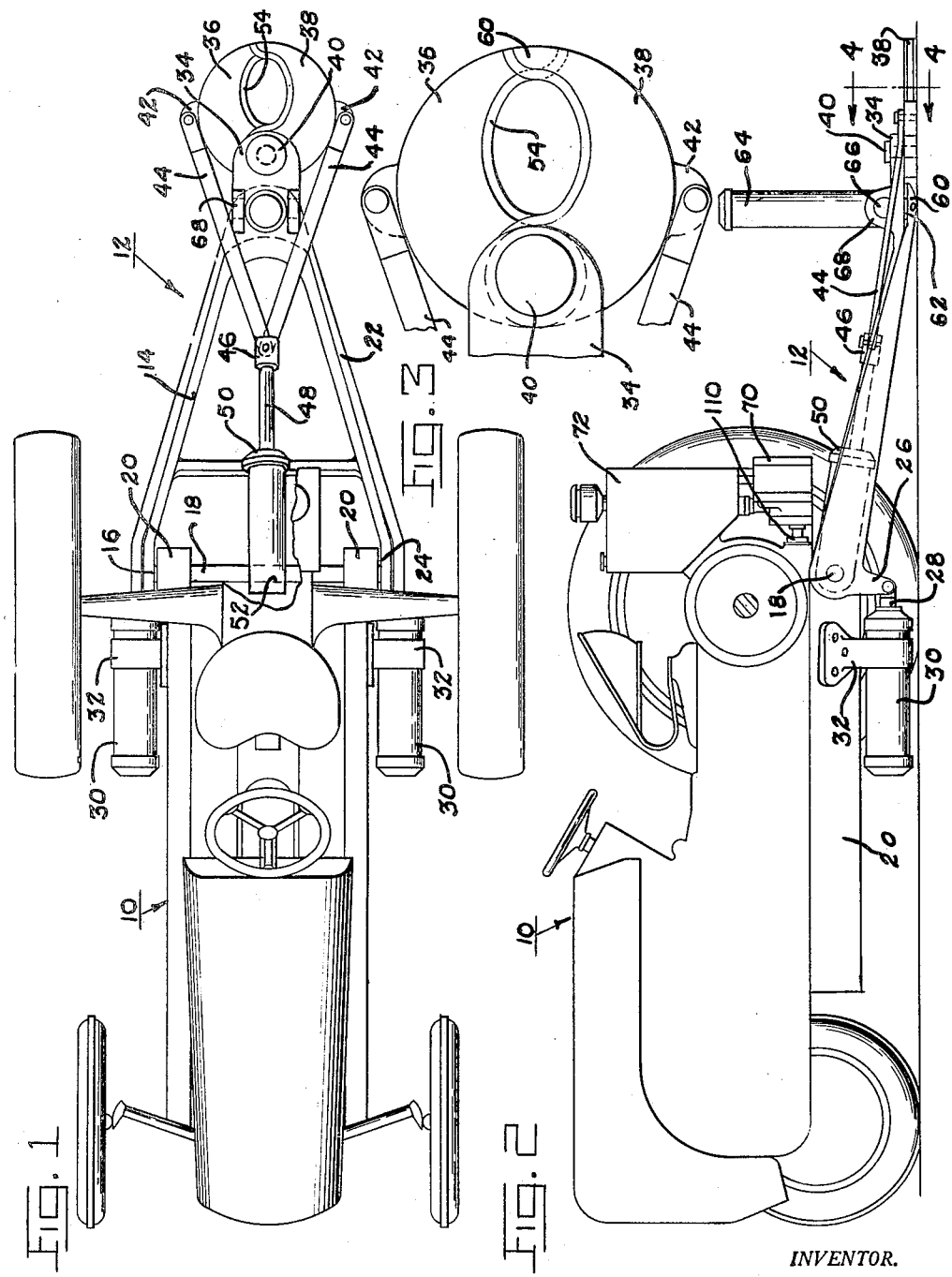
INVENTOR.
THOMAS SLICK
BY
Toulmin & Toulmin
ATTORNEYS

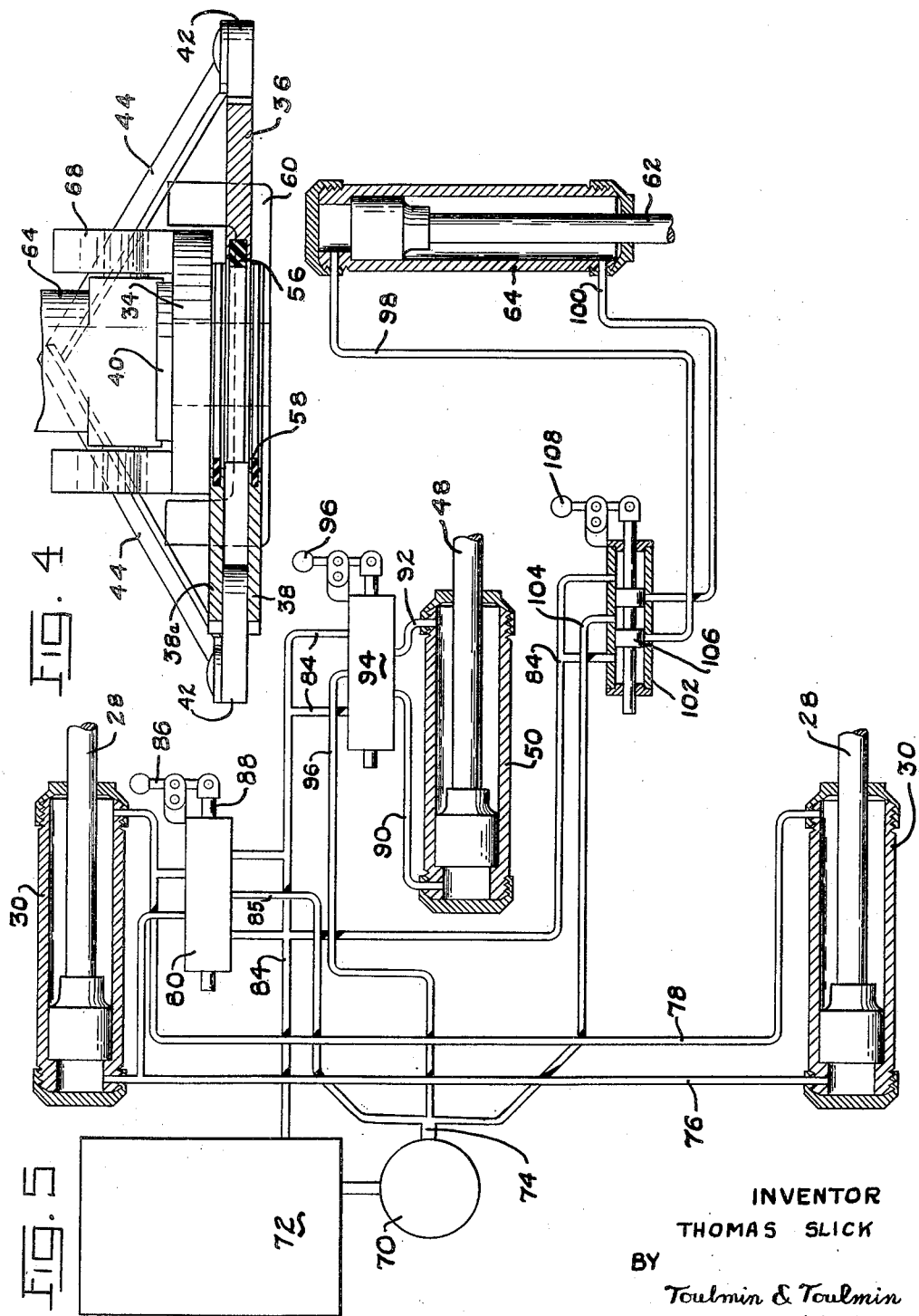

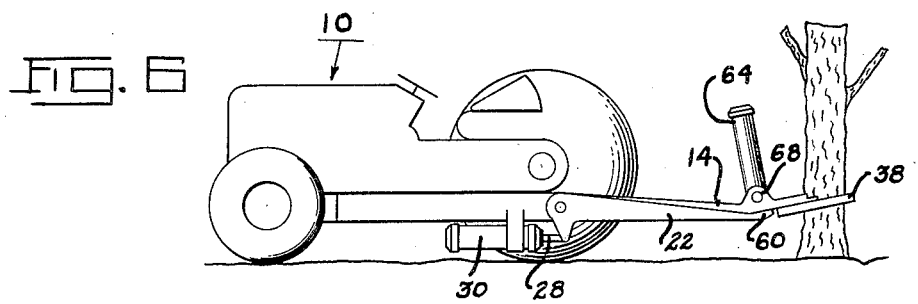
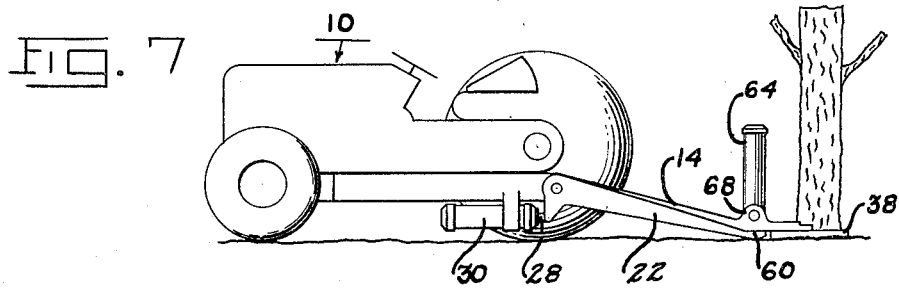
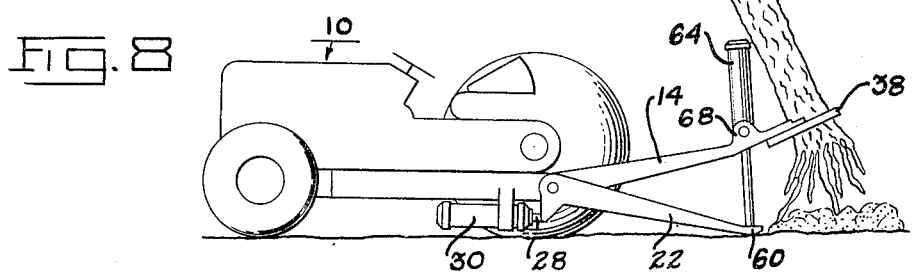
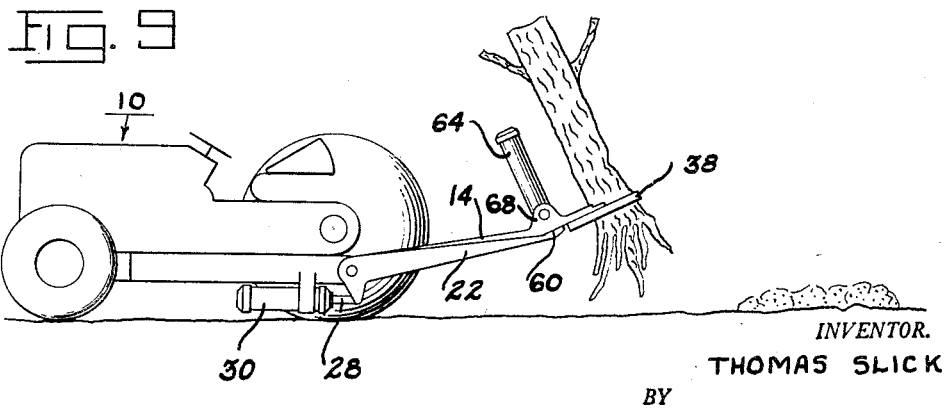

Patented Dec. 26, 1950

2,535,099

UNITED STATES PATENT OFFICE 2,535,099

BRUSH PULLER

Thomas Slick, San Antonio, Tex., assignor to Institute of Industrial Research, San Antonio, Tex., a foundation of Texas Application August 9, 1947, Serial No. 767,783

15 Claims. (Cl. 254—132)

This invention relates to a method and apparatus for pulling brush, bushes, tree stumps and the like from the ground when clearing areas. More particularly, this invention relates to an apparatus of this general type adapted for being mounted on a tractor for being transported and operated thereby.

In the clearing of ground of stumps and brush, it is often difficult to remove them from the ground except by blasting or other inconvenient means. Also, except by blasting, the stumps and brush are generally pulled from the ground with a sideward motion thereby greatly increasing the power required to accomplish any certain amount of work. In general, there is no adequate device for enabling stumps and the like to be removed from the ground easily, rapidly, and without the expenditure of a great deal of power.

The primary object of the present invention is to provide a simple and effective device adapted for pulling stumps and brush from the ground.

Another object is to provide a device for pulling brush and stumps from the ground which is adapted for being mounted on the frame of an ordinary tractor.

A still further object is to provide a device for pulling brush and stumps from the ground in which the power requirements are a minimum due to the fact that the thrust on the article being pulled from the ground is directed vertically upwardly.

Another object is the provision of a brush or stump puller which is convenient and rapid to use and which may be employed for carrying the pulled out stumps and brush if desired.

Reference is made to the co-pending application of Walter Ernst and Dick Franklin Boyd, Serial No. 744,900, entitled Brush Puller, filed April 30, 1947, which is a development based upon my application herein.

These and other objects and advantages will become more apparent upon reference to the following description taken in connection with the accompanying drawings in which:

Figure 1 is a plan view of a tractor having a puller according to this invention mounted thereon;

Figure 2 is a side view of the tractor and puller combination with the rear wheels of the tractor removed;

Figure 3 is a plan view over the gripping jaws of the puller;

Figure 4 is a sectional view indicated by the line 4—4 on Figure 2 and showing the construction of the gripping jaws of the puller;

Figure 5 is a diagrammatic diagram of a hydraulic circuit for actuating the several rams of the puller; and Figures 6 through 9 are action views showing the puller in operation.

Referring to the drawings there is shown a tractor generally indicated at 10 and mounted thereon the brush pulling unit of this invention generally indicated at 12. The pulling device comprises a generally V-shaped main frame 14 which is pivoted at 16 to a shaft 18 which is carried at the rear end of the tractor 10 in the journal members or brackets 20. The brackets 20 may be secured to the frame of the tractor and may further, as shown in Figure 2, comprise elongated frame members which lie along the bottom of the tractor frame and which are secured thereto.

Substantially co-extensive with the frame 14 is a second frame part 22 which is also journaled on the shaft 18 as at 24. The frame part 22 has, adjacent the shaft 18, a pair of extensions 26 which are connected with the rams 28 reciprocable in the cylinders 30 carried on the brackets 20 as by means of the supporting members 32. As will become apparent hereinafter the rams 28 may be extended from the cylinders 30 in order to raise the entire pulling device about the shaft 18 into an elevated position.

The frame part 14 has a rearwardly extending part 34 to which is pivoted a pair of jaw members 36 and 38 by the pivot pin 40. Each of the jaw members 36 and 38 has a laterally extending lug 42 thereon each of which is connected with a draw bar 44. The draw bars 44 extend toward the tractor and are mounted on a common pivot 46 on the end of the ram 48 which is reciprocable in a cylinder 50.

The cylinder 50 is mounted on the shaft 18 by means of the bored portion 52 which is integral with or carried by the said cylinder. It will be apparent that the reciprocation of the ram 48 in the cylinder 50 will operate, through the draw bars 44 to open and close the jaws 36 and 38.

The exact construction of the jaw members is better seen in Figures 3 and 4 when it will be noted that the jaw 36 comprises a fairly heavy plate and having an arcuate center part 54 which is lined with a block of resilient material such as rubber at 56. The other jaw 38 is similarly shaped but comprises the upper and lower plates 38a each of which is lined around its arcuate center part with a resilient block as at 58. It will be noted, especially in Figure 3, that the ends of the jaw members are arranged to telescope as at 60 so that in normal operation when they are clamped around an object they form a substantially rigid gripping unit.

The other frame part 22 has its rear end formed into a pad portion 60 which extends across beneath the projecting part 34 of the frame 14. The portion 60 of the frame 22 is a jack pad and is adapted for being thrust downwardly against the ground in order to put a vertical thrust on the jaws when they are clamped about an object to be pulled.

For generating the said thrust, the pad portion 60 has secured thereto a ram 62 which extends vertically upwardly through an aperture in the extending portion 34 in the frame 14 and into a cylinder 64. The cylinder 64 has a trunnion support 66 at its lower end which includes the upstanding bearing ears or lugs 68 of the frame 14.

For actuating the several rams to clamp the jaws, to lift them upwardly to pull the clamped article from the ground, and to elevate the entire lifting unit from the ground, the hydraulic circuit shown in Figure 5 may be employed. In Figure 5 there is a pump 70 which carries fluid from the reservoir 72 and which discharges fluid to a conduit 74 which leads to the several valves which control the rams of the pulling device.

The unit lifting rams 28 which reciprocate in the cylinders 30 are connected in parallel by the conduits 76 and 78 which lead to the service ports of a four-way distributing valve 80 which has its inlet connected by a conduit 85 with a conduit 74 and its exhaust ports connected with the exhaust manifold 84. A lever 86 is provided for actuating the valve member 88 of the valve 80 to connect either of the conduits 76 or 78 with the pressure conduit 85 while connecting the other thereof with the exhaust manifold 84.

The ram 48 which reciprocates in the cylinder 50 for actuating the jaws is similarly supplied with pressure fluid through the conduits 90 and 92 which lead to the service ports of a four-way valve 94 that receives pressure fluid from the conduit 96 leading to the pressure conduit 74, and which is also connected with the exhaust manifold 84. A shifting lever 96 is provided for selectively supplying pressure fluid to one side or the other of the ram 48.

The jack ram 62 which reciprocates in the cylinder 64 is adapted for receiving fluid from the conduits 98 and 100 which lead to the service ports of a four-way valve 102 which has its inlet connected to the conduit 104 by the pressure conduit 74 and which also has connections with the exhaust manifold 84. The valve 102 is provided with a valve member 106 which is shiftable by lever 108 from a certain position wherein the conduits 98 and 100 are blocked off into opposite end positions wherein one or the other of the conduits 98 and 100 is supplied with pressure fluid and the other thereof is exhausted.

All of the four-way valves 80, 94 and 102 are preferably constructed in the same manner so that at any time the valve members thereof are centered the conduits leading to the controlled rams are blocked off. This prevents the parts from shifting when the puller is transported and enables the puller to be retained in its elevated position within maintaining pressure on the pump 70.

In Figures 6 through 9 the pulling unit is shown in operation. The first step is to back the tractor with the pulling unit elevated and the jaws open until the jaws are positioned around the object to be pulled from the ground. Thereafter the unit is lowered until it rests on the ground and the jaws are closed around the object to be pulled by energizing the ram 48. At this time it is preferable to release the brakes on the tractor so that it may shift somewhat during the pulling operation and thus avoid undue strain on the parts of the pulling device.

After the jaws have been clamped around the article to be pulled, the jack ram 62 is energized to force the jack pad 60 against the ground and thereby to thrust vertically upwardly on the extension 34 of the frame 14 and thereby to lift the jaws and the article gripped thereby. After the article has been pulled from the ground, as shown in Figure 8, the puller of this invention may then be released from the object, or may be employed for carrying the object by de-energizing the jack ram and energizing the lifting rams 28 while retaining the jaws clamped. This is illustrated in Figure 9. It will be seen that the pulling of stumps and brush by the apparatus of this invention is relatively simple and may be quickly done with the expenditure of a minimum of power. The pulling unit is readily adaptable to any type of tractor frame and is substantially complete in itself.

A further feature of this invention resides in the fact that the pump 70 may be mounted as shown in Figure 2 in order to receive power from the tractor power take-off 110 and that the reservoir 72 may be conveniently mounted on the tractor frame directly above said pump. Thus, an ordinary tractor may be converted into a mobile brush and stump pulling device merely by mounting thereon the unit shown and described in this application.

It will be understood that this invention is susceptible to modification in order to adopt it to different usages and conditions and, accordingly, it is desired to comprehend such modifications within this invention as may fall within the scope of the appended claims.

I claim:

1. In a unit for pulling objects from the ground; a frame adapted for being pivotally supported on a transverse axis at one end of a tractor; jaw members pivoted on a vertical axis at one end of said frame; jack means carried on said frame adjacent said jaw members; hydraulic means for selectively actuating said jaw members and said jack means; and hydraulically operated means for lifting said frame about its pivotal connection with a tractor for transporting said unit.

2. In a unit for pulling objects from the ground; a first frame adapted for being pivotally mounted at one end of a tractor; cooperating jaw members mounted on a vertical pivot at one end of said first frame; a second frame also adapted for being pivotally supported by said tractor and having one end lying beneath said one end of said first frame; hydraulic means for actuating said jaw members to grip an object; a hydraulically actuated jack means connected between said frames; and a hydraulic lift for said frames connected to the second thereof adjacent its pivotal connection to the tractor.

3. In combination with a tractor; a transverse pivot axis at one end of said tractor; a first frame pivoted on said axis and extending from said tractor; cooperating jaw means mounted on a vertical pivot at one end of said first frame; motor means for actuating said jaw means; a second frame also pivoted on said transverse axis and extending from said tractor and having a part extending across and beneath said one end of said first frame; a jack motor having one part connected with said first frame and the other part connected with said second frame; lifting motor means connected between said second frame and said tractor; and means for selectively energizing the several said motors.

4. In combination with a tractor; a pivot axis extending transversely at one end thereof; a first frame pivoted on said axis and extending from said tractor; a pair of telescoping jaw members mounted on a vertical pivot at one end of said frame; a second frame pivoted on said axis and extending from said tractor and having a part extending across and beneath said one end of said first frame; a jaw motor comprising a cylinder pivoted on said axis and a ram reciprocable therein and connected with said jaws; a jack motor comprising a ram connected to a part of said second frame extending across beneath said first frame and a cylinder pivotally mounted on said first frame and into which said ram extends; a lifting motor comprising cylinder means connected with said tractor and ram means reciprocable therein and connected with one of said frames; and means comprising a pump and valves for selectively energizing said motors.

5. In combination with a tractor, a brush and stump pulling unit comprising; a first frame pivotally suspended from one end of said tractor; jaws pivotally mounted on one end of said frame and selectively energizable for gripping an object to be pulled from the ground; a second frame pivotally suspended from said one end of said tractor and extending across and beneath said one end of said first frame; means for spreading said frames apart; and means for elevating both of said frames about their pivotal support with said tractor to permit the transportation of said unit.

6. In combination with a tractor; a first frame pivoted at one end on transverse axis means at one end of said tractor; jaw members vertically pivotally mounted at the other end of said first frame; motor means selectively energizable for actuating said jaw members; a second frame also pivotally mounted at one end on said axis means and having a pad at its other end extending across beneath said other end of the first frame and between said jaw members and said tractor; motor means selectively energizable for urging the said other ends of said frames apart; arms extending downwardly from the said one end of said second frame adjacent said axis; and motor means connected between said arms and said tractor and selectively energizable for elevating said frames about their pivotal connection with said tractor into carrying position.

7. In a unit for pulling objects from the ground; a frame adapted for being pivotally mounted on a tractor; telescoping jaw means carried on the end of said frame opposite its connection with said tractor, said jaw means including means to enhance the gripping power thereof; a jack pad beneath the frame at the jaw end thereof; jack means on said frame adjacent said jaw means and acting between the frame and the jack pad to force the pad against the ground whereby elevating thrusts on the frame impose no load on the tractor connected to said frame; elevating mechanism for elevating said frame, jaw means, pad, and jack means in unison about the pivotal connection of said frame with a tractor; and hydraulic means operable for selectively actuating said jaw means, said jack means and said elevating mechanism.

8. In a unit for pulling objects from the ground; a frame adapted for being pivotally supported on a tractor; jaw members pivoted on a vertical axis at the end of said frame opposite its connection with said tractor; a jack pad beneath the frame at the jaw end thereof; a jack carried on said frame adjacent said jaws and acting between the frame and pad to force the pad against the ground whereby elevating thrusts on the frame impose no load on the tractor connected to said frame; and hydraulic means for selectively actuating said jaw members and said jack.

9. In a mobile brush and stump pulling unit; a tractor; a transverse pivot axis at the rear end of said tractor; superposed frame means mounted on said axis; means for selectively elevating said frame means in unison about said axis for transportation of said unit or for lowering said frame means in unison for operation of said unit; jaw means mounted on the upper of said frames and operable in a horizontal plane for gripping articles to be dislodged from the ground; and motor means acting between said frame means at the jaw end thereof and energizable for urging said frames apart in a vertical plane for dislodging from the ground the article gripped by said jaws.

10. In combination in a device for pulling brush, stumps and the like, a pair of interposed frames; jaw means vertically pivoted at one end of the upper one of said frames and opening away from the frames, said jaw means being adapted for gripping therebetween the article to be pulled; and jack means also carried at the said one end of said frames connected between said frames and energizable for urging said frames apart to cause the lower thereof to engage the ground and thrusting the upper frame upwardly for elevating the said one end thereof for causing the jaw means thereon to pull the article gripped thereby from the ground, said jack means being carried in their entirety at the said one end of the frames whereby the thrust of said jack means is confined to acting on the frames at the said one end.

11. In a unit for pulling an object from the ground; a frame, means on the frame forming pivot axis means for the pivotal connection thereof with a tractor, telescoping jaw means mounted on said frame at the end opposite said axis, a jack carried on the frame adjacent the jaw end thereof, a jack pad beneath the frame operatively associated with the jack, said jack acting directly between the frame and pad to force the pad against the ground for urging the frame upwardly, and hydraulic means for actuating the jaw means and jack, the hydraulic means for the jaw means acting between said axis and said jaw means whereby all jaw and jack actuating thrusts are contained within the frame.

12. In a brush or stump pulling device; a pair of superposed frames; horizontally movable jaw means pivotally supported at one end of said frames on the upper one thereof, said jaw means opening away from said frames; motor means for actuating said jaw means; vertically movable motor jack means also carried at the said one end of said frames connected between the frames and adapted for thrusting the lower frame downwardly against the ground directly beneath the said one end of the frames, whereby the thrust of the jack means is confined to the said one end of the frames.

13. The method of pulling brush, stumps, and the like from the ground which comprises; gripping the article to be pulled between a pair of cooperating pivoted jaws forming a part of a vertically movable carrying frame, and dislodging the gripped article from the ground by a vertical thrust applied between the jaw end of the carrying frame and the ground directly therebeneath.

14. In combination with a tractor; a brush or stump puller having a frame with means adapted for connection with the tractor frame, a pair of jaws pivoted for movement in a horizontal plane at the rear end of the frame, said jaws opening away from the frame, jack means carried at the jaw end of the frame and including ground engaging means, a fluid motor for actuating said jaws in opening and closing movements, and fluid motor means carried at the jaw end of said frame and operatively associated with said jack means energizable for actuating said jack means, a fluid pump on said tractor driven thereby hydraulically connected with said fluid motors, and control valves for said motors operatively connected therewith.

15. In a brush or stump puller; a frame having means for connection with a tractor chassis, horizontally movable jaws at one end of the frame for gripping articles to be pulled and opening away from the frame, jack means carried at the jaw end of the frame energizable for thrusting vertically upwardly on the jaw end of the frame, fluid operable ram means connected with said jaws and cylinder means into which said ram means extend, means pivotally supporting said cylinder means on the frame, and fluid operable actuating means at the jaw end of the frame and connected with said jack means.

THOMAS SLICK.

REFERENCES CITED

The following references are of record in the file of this patent:

UNITED STATES PATENTS

| Number | Name | Date |
|---|---|---|
| 1,437,547 | Pope | Dec. 5, 1922 |
| 2,189,052 | Anthony | Feb. 6, 1940 |
| 2,214,334 | Knight | Sept. 10, 1940 |
| 2,332,561 | Drott | Oct. 26, 1943 |
| 2,436,510 | Ferguson | Feb. 24, 1948 |

FOREIGN PATENTS

| Number | Country | Date |
|---|---|---|
| 142,526 | Austria | Aug. 10, 1935 |